United States Patent
Hall et al.

(10) Patent No.: US 10,378,345 B2
(45) Date of Patent: Aug. 13, 2019

(54) CAPSULES CONTAINING MICRO-PROPPANT AND A SUBSTANCE TO PRODUCE MICRO-SEISMIC EVENTS

(71) Applicant: Halliburton Energy Services, Inc., Houston, TX (US)

(72) Inventors: Lee J. Hall, The Woodlands, TX (US); Phillip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 166 days.

(21) Appl. No.: 15/534,975

(22) PCT Filed: Feb. 3, 2015

(86) PCT No.: PCT/US2015/014335
§ 371 (c)(1),
(2) Date: Jun. 9, 2017

(87) PCT Pub. No.: WO2016/126240
PCT Pub. Date: Aug. 11, 2016

(65) Prior Publication Data
US 2017/0350244 A1    Dec. 7, 2017

(51) Int. Cl.
*E21B 43/267* (2006.01)
*E21B 47/00* (2012.01)
(Continued)

(52) U.S. Cl.
CPC ........... *E21B 49/00* (2013.01); *C09K 8/66* (2013.01); *C09K 8/80* (2013.01); *C09K 8/805* (2013.01);
(Continued)

(58) Field of Classification Search
CPC ....... E21B 43/263; E21B 43/267; E21B 47/00
See application file for complete search history.

(56) References Cited

U.S. PATENT DOCUMENTS

| 7,134,492 B2 | 11/2006 | Willberg et al. |
| 8,168,570 B2 | 5/2012 | Barron et al. |

(Continued)

FOREIGN PATENT DOCUMENTS

| WO | WO2011081549 | 7/2011 |
| WO | WO2015026319 | 2/2013 |

(Continued)

OTHER PUBLICATIONS

Canadian Office Action dated May 8, 2018; Canadian Patent Application No. 2,970,096.

(Continued)

*Primary Examiner* — Kipp C Wallace
(74) *Attorney, Agent, or Firm* — McGuireWoods LLP (57) ABSTRACT

A method of mapping micro-fractures of a fracture network comprising: introducing a capsule or coated capsule or containment into the fracture network, where in the capsules or containment comprise an explosive substance and a plurality of micro-proppant; allowing initiation of the explosive substance of some or all of the plurality of the capsules to occur, wherein initiation of the explosive substance causes detonation of the explosive substance, and wherein the detonation produces one or more micro-seismic events; and causing or allowing at least a portion of the micro-proppant to enter one or more of the micro-fractures.

22 Claims, 5 Drawing Sheets

(51) Int. Cl.
*E21B 49/00* (2006.01)
*C09K 8/80* (2006.01)
*E21B 43/263* (2006.01)
*C09K 8/66* (2006.01)
*F42D 3/06* (2006.01)
*G01V 1/104* (2006.01)
*E21B 43/26* (2006.01)
*G01V 1/28* (2006.01)

(52) U.S. Cl.
CPC .......... *E21B 43/263* (2013.01); *E21B 43/267* (2013.01); *F42D 3/06* (2013.01); *G01V 1/104* (2013.01); *E21B 43/26* (2013.01); *G01V 1/288* (2013.01)

(56) References Cited

U.S. PATENT DOCUMENTS

| | | | | |
|---|---|---|---|---|
| 8,453,731 | B2* | 6/2013 | Kumar | G01V 1/104 166/250.1 |
| 2004/0226715 | A1* | 11/2004 | Willberg | E21B 47/00 166/250.1 |
| 2009/0288820 | A1 | 11/2009 | Barron et al. | |
| 2010/0212897 | A1* | 8/2010 | Nguyen | E21B 43/267 166/280.1 |
| 2013/0032337 | A1* | 2/2013 | Rytlewski | E21B 43/263 166/250.1 |
| 2013/0284438 | A1* | 10/2013 | Dusseault | E21B 43/26 166/280.1 |
| 2014/0158356 | A1 | 6/2014 | Andrzejak et al. | |
| 2014/0216730 | A1* | 8/2014 | Ersoz | G01V 1/42 166/250.1 |
| 2014/0262295 | A1 | 9/2014 | Aines et al. | |
| 2015/0021023 | A1* | 1/2015 | Roberts | E21B 43/263 166/280.1 |
| 2016/0341035 | A1* | 11/2016 | Andrzejak | F42B 1/00 |

FOREIGN PATENT DOCUMENTS

| | | |
|---|---|---|
| WO | WO2013154537 | 10/2013 |
| WO | WO2014195929 | 11/2014 |
| WO | WO2014193409 | 12/2014 |
| WO | WO2015026331 | 2/2015 |

OTHER PUBLICATIONS

N.R. Warpinski, et al "Autonomous Microexplosives Subsurface Tracing System Final Report"; Sandia Report SAND2004-1415 Printed Apr. 2004; 70 pages.
International Search Report and Written Opinion dated Oct. 21, 2015 on related PCT Application No. PCT/US2015/014335.

* cited by examiner

CAPSULES CONTAINING MICRO-PROPPANT AND A SUBSTANCE TO PRODUCE MICRO-SEISMIC EVENTS

TECHNICAL FIELD

Hydraulic fracturing operations can be used to stimulate production of a reservoir fluid. Proppant is commonly placed within the fractures to prop the fracture open. Micro-proppant can be placed within micro-fractures of a fracture network. Micro-seismic events can also be used to map the geometry of the micro-fractures.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

As used herein, a "fluid" is a substance having a continuous phase that tends to flow and to conform to the outline of its container when the substance is tested at a temperature of 71° F. (22° C.) and a pressure of 1 atmosphere "atm" (0.1 megapascals "MPa"). A fluid can be a liquid or gas. A homogenous fluid has only one phase; whereas a heterogeneous fluid has more than one distinct phase. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, a "base fluid" is the liquid that is in the greatest concentration and will be the solvent of a solution or the continuous liquid phase of a heterogeneous fluid. The base fluid can contain dissolved or undissolved substances.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation including, into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

After a wellbore is drilled, it may often be necessary to fracture the subterranean formation to enhance hydrocarbon production, especially in tight formations like shale formations and tight-gas sands. A fracturing fluid, often called a pad fluid, is pumped using a frac pump at a sufficiently high flow rate and high pressure into the wellbore and into the subterranean formation to create or enhance a fracture in the subterranean formation. Creating a fracture means making a new fracture in the formation. Enhancing a fracture means enlarging a pre-existing fracture in the formation. As used herein, the term "fracture" means the creation or enhancement of a natural fracture using a fracturing fluid, and can be referred to as "man-made." To fracture a subterranean formation typically requires hundreds of thousands of gallons of fracturing fluid. Further, it is often desirable to fracture at more than one downhole location. Therefore, the base fluid of a fracturing fluid is usually water or water-based for various reasons, including the ready availability of water and the relatively low cost of water compared to other liquids.

The newly-created or enhanced fracture will tend to close together after pumping of the fracturing fluid has stopped due to the weight of the subterranean formation. To prevent the fracture from closing, a material must be placed in the fracture to keep the fracture propped open. A material used for this purpose is often referred to as a "proppant." The proppant is in the form of solid particles, which can be suspended in the fracturing fluid, carried down hole, and deposited in the fracture as a "proppant pack." The proppant pack generally props the fracture in an open position while allowing fluid flow through the permeability of the pack.

Proppant materials generally include silicon dioxide, walnut shells, sintered bauxite, glass, plastics, ceramic materials, and any combination thereof in any proportion. The proppant is an appropriate size to prop open the fracture and allow fluid to flow through the proppant pack, that is, in between and around the proppant making up the pack. Appropriate sizes of particulate for use as a proppant are typically in the range from about 8 to about 100 U.S. Standard Mesh. A typical proppant is sand-sized, which geologically is defined as having a largest dimension ranging from 0.0625 millimeters up to 3 millimeters.

The subterranean formation will exert a force or pressure on the proppant located within the fracture. This is known as the closure stress of the formation or fracture. The proppant should be sufficiently strong, that is, have a sufficient compressive or crush resistance, to prop the fracture open without being deformed or crushed by the closure stress of the fracture. Pressures from the subterranean formation on the proppant located in the fractures can be as high as 10,000 to generally 15,000 or more pounds force per square inch (psi). If a proppant material crushes under closure stress, then the fracture will close and no longer function to provide a less restrictive fluid flow path for production of reservoir fluids.

In some formations, such as shale formations, fractures can further branch into small fractures extending from a primary fracture giving depth and breadth to the fracture network created in the subterranean formation. As used herein, a "fracture network" refers to the fractures, micro-fractures, and/or branches, man-made or otherwise, within a subterranean formation that are in fluid communication with the wellbore.

It is often desirable to map the fracture geometry of the fracture network, especially the micro-fractures or secondary fractures in the network. Mapping can be accomplished by using seismic events. Seismic events can be triggered by the detonation or deflagration of an explosive substance. As used herein, the term "detonation" includes deflagration without the need to continually refer to both detonation and deflagration in the alternative. The detonation can be triggered by causing initiation of the explosive substance. An initiator may be activated in response to external stimuli, including pressure, an electrical signal, and/or a chemical reaction, for example, with water.

As used herein, the term "initiate," and all grammatical variations thereof, means to begin a chemical reaction that causes the deflagration or detonation of an explosive substance. As used herein, the term "initiator" means a device or material that is capable of initiating an explosive substance. As used herein, the term "deflagrate," and all grammatical variations thereof, means the decomposition of an explosive substance that is propagated by a flame front that moves slowly through the explosive substance, at a subsonic rate (e.g., usually below 2,000 meters per second (m/s)). This type of decomposition is characteristic of a low explosive substance. As used herein, the term "detonate," and all grammatical variations thereof, means the decomposition of an explosive substance that is propagated by a shock wave that passes through the explosive substance at supersonic speeds (e.g., up to 9,000 m/s). This type of decomposition is characteristic of a high explosive substance. Some explosives are capable of deflagration and detonation.

Explosive substances can be categorized by their sensitivity to stimuli. Primary explosives are highly sensitive to stimuli such as impact, friction, heat, and/or electrostatic charges; whereas, secondary explosives are less sensitive to stimuli. Those skilled in the art often use the sensitivity of lead azide or lead styphnate explosive as a benchmark. Primary explosives may be identified as explosives that are equally, or more sensitive than, lead azide or lead styphnate, while secondary explosives may be identified as explosives that are less sensitive than lead azide or lead styphnate. Explosives may be additionally characterized by a variety of different parameters including sensitivity to impact, thermal stability, ability to dent a standard metal plate when detonated, crystal size, shape, and other parameters. For example, primary explosives are generally very sensitive to stimuli; thus, they can be initiated via a relatively small amount of heat, pressure, or other stimuli. Examples of primary explosives include: lead azide, lead styphnate, silver azide, and silver fulminate. By contrast, secondary explosives are far less sensitive to stimuli, thus making them more resistant to heat, pressure, or other stimuli.

Micro-fractures of a fracture network are on such a small scale compared to the size of the primary fractures that there are currently no effective means to accurately map the entire fracture network. Therefore, there is a need and an ongoing industry-wide concern for being able to accurately map the secondary or micro-fractures of the fracture network and effectively place proppant into the micro-fractures.

It has been discovered that a capsule containing an explosive substance in the core and a plurality of micro-proppant can be used to map the geometry of secondary or micro-fractures and place micro-proppant within the micro-fractures. The energy released during the detonation of the explosive substance can produce micro-seismic events that allow the mapping of the micro-fractures. The release of energy can also aid in the effective placement of the micro-proppant within the micro-fractures.

According to certain embodiments, a method of mapping micro-fractures of a fracture network comprises: introducing a capsule, coated capsule, or containment into the fracture network, wherein the capsules or containment comprise an explosive substance and a plurality of micro-proppant; allowing initiation of the explosive substance of some or all of the plurality of the capsules to occur, wherein initiation of the explosive substance causes detonation of the explosive substance, and wherein the detonation produces one or more micro-seismic events; and causing or allowing at least a portion of the micro-proppant to enter one or more of the micro-fractures.

Figure 1:
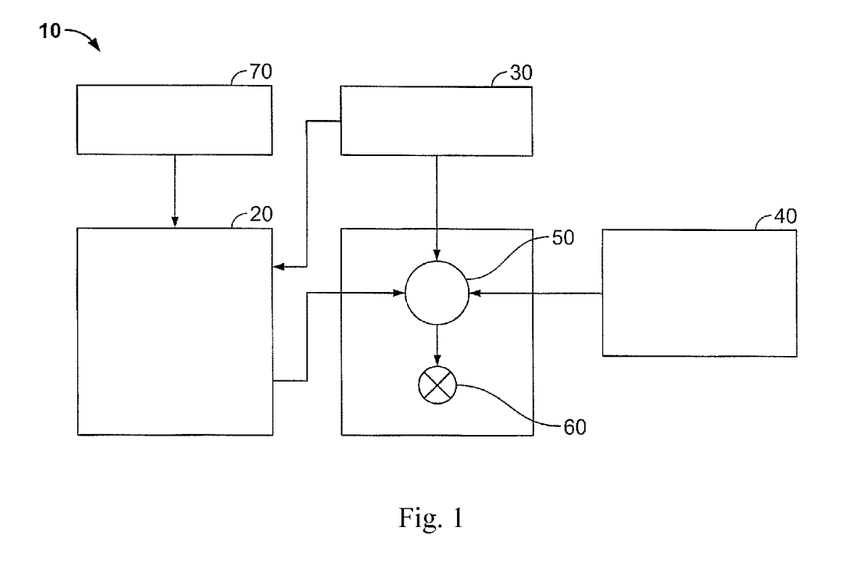
FIG. 1 is a diagram illustrating a fracturing system according to certain embodiments.

The fracturing system 10 of FIG. 1 can include a fracturing fluid producing apparatus 20, a fluid source 30, a proppant source 40, and a pump and blender system 50 and resides at the surface at a well site where a well 60 is located. In certain embodiments, the fracturing fluid producing apparatus 20 combines a gel precursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30.

The proppant source 40 can include a proppant (including micro-proppant) for combining with the fracturing fluid. The system may also include an additive source 70 that provides one or more additives (e.g., gelling agents, weighting agents, and/or other optional additives) to alter the properties of the fracturing fluid. This source can also have a hopper for on the fly coating of the proppant with the coating and nano material, or this source can be used to introduce pre-treated or pre-cured resin coated proppant into a treatment fluid.

The pump and blender system 50 can receive the fracturing fluid and combine it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. The fracturing fluid producing apparatus 20, fluid source 30, and/or proppant source 40 can each be equipped with one or more metering devices (not shown) to control the flow of fluids, proppant, and/or other compositions to the pumping and blender system 50. Such metering devices can facilitate the pumping. The blender system 50 can source from one, some, or all of the different sources at a given time, and can facilitate the preparation of fracturing fluids using continuous mixing or "on-the-fly" methods. Thus, for example, the pumping and blender system 50 can provide just fracturing fluid into the well at some times, just proppant at other times, and combinations of those components at yet other times.

Figure 2:
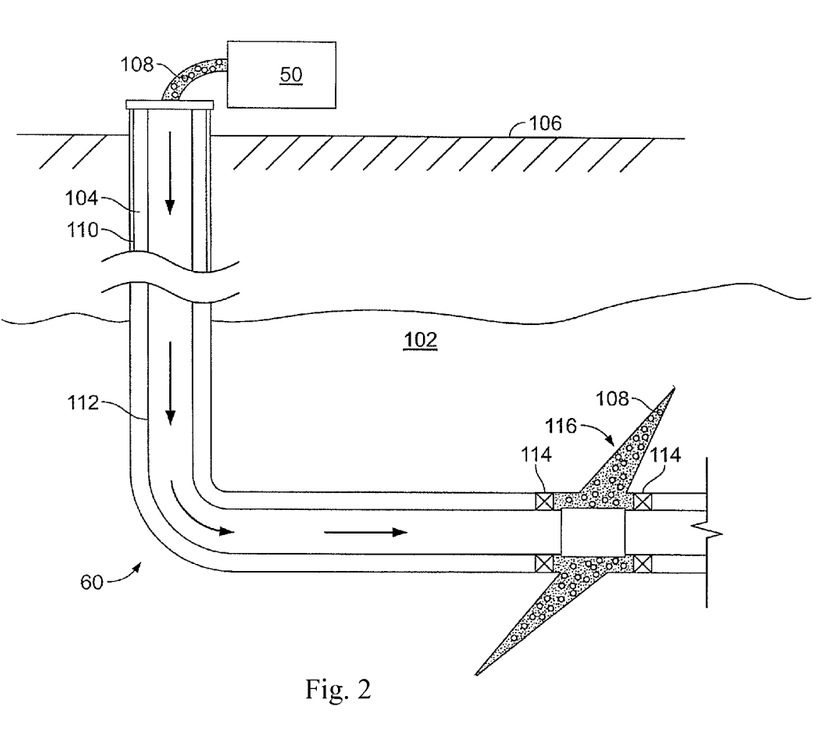
FIG. 2 is a diagram illustrating a well system in which a fracturing operation can be performed.

The fracturing fluid can be pumped into the subterranean formation. FIG. 2 shows the well 60 during a fracturing operation in a portion of a subterranean formation 102. The subterranean formation can be penetrated by a well. The well can be, without limitation, an oil, gas, or water production well, an injection well, or a geothermal well. The well can also be an offshore well. The well includes a wellbore 104. The wellbore 104 extends from the surface 106, and the fracturing fluid 108 is introduced into a portion of the subterranean formation 102. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shaped charges, a perforating gun, hydro-jetting and/or other tools.

The well is shown with a work string 112. The pump and blender system 50 can be coupled to the work string 112 to pump the fracturing fluid 108 into the wellbore 104. The work string 112 can include coiled tubing, jointed pipe, and/or other structures that allow fluid to flow into the wellbore 104. The work string 112 can include flow control devices, bypass valves, ports, and or other tools or well devices that control a flow of fluid from the interior of the work string 112 into the subterranean formation 102. For example, the work string 112 can include ports (not shown) located adjacent to the wellbore wall to communicate the fracturing fluid 108 directly into the subterranean formation 102, and/or the work string 112 can include ports that are spaced apart from the wellbore wall to communicate the fracturing fluid 108 into an annulus that is located between the outside of the work string 112 and the wall of the wellbore.

Figure 3:
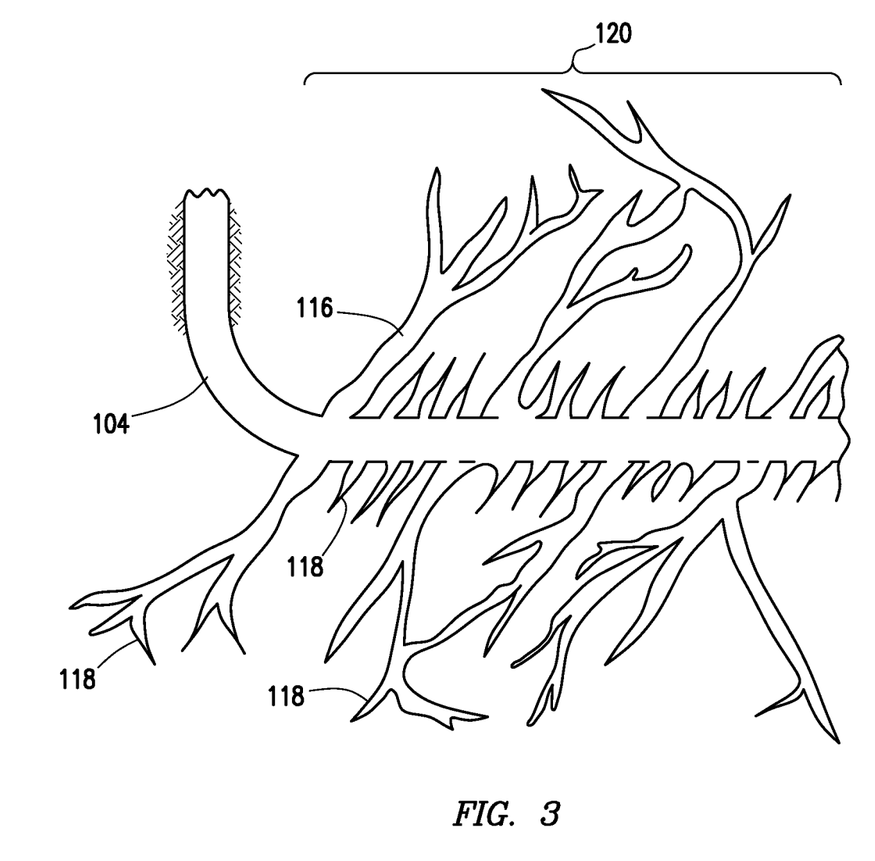
FIG. 3 is a diagram illustrating a fracture network including a plurality of micro-fractures.

The well system can include one or more sets of packers 114 that create one or more wellbore intervals. The methods also include creating or enhancing one or more fractures within the subterranean formation using the fracturing fluid. When the fracturing fluid 108 is introduced into wellbore 104 (e.g., in FIG. 2, the wellbore interval located between the packers 114) at a sufficient hydraulic pressure, one or more fractures 116 may be created in the subterranean formation 102. As can be seen in FIG. 3, the fracturing fluid can create a fracture network 120. The fracture network 120 can include one or more primary fractures 116 and one or more secondary or micro-fractures 118. The micro-fractures 118 can branch from the primary fractures 116. The height and/or width of the primary fractures 116 will generally be greater than the micro-fractures 118.

The methods include introducing at least one or a plurality of capsules 200 or one or more containments into the fracture network 120. It is to be understood that as used herein, reference to "capsule" is intended to include a capsule, a coated capsule, or a containment without the need to continually refer to all of the embodiments in the alternative throughout. The step of introducing can be performed simultaneously with the creation of the fracture network 120 via the pumping of the fracturing fluid 108. The step of introducing can be performed after the creation of the fracture network 120. Moreover, the fracturing fluid can include proppant. The proppant in the fracturing fluid 108 can enter the primary fractures 116 where they may remain after the fracturing fluid flows out of the wellbore. The proppant can be placed into the one or more fractures during the step of introducing. The proppant can form a proppant pack within the one or more fractures.

According to another embodiment, larger proppant can be introduced into the primary fractures 116 after the capsules 200 are introduced into the fracture network 120. The capsules 200 can be introduced into the fracture network 120 via a treatment fluid. The treatment fluid can further include additional micro-proppant or small proppant. In this manner, the micro-proppant can be placed within the micro-fractures 118 and then a subsequent fluid carrying the larger proppant can be introduced into the primary fractures 116 of the fracture network 120 such that all of the fractures are propped open via the proppant. The treatment fluid can include a base fluid. As used herein, the term "base fluid" means the liquid that is in the greatest concentration and is the solvent of a solution or the continuous phase of a heterogeneous fluid. The base fluid can include water. The water can be selected from the group consisting of fresh water, brackish water, sea water, brine, produced water—as it is or processed, and any combination thereof in any proportion. The treatment fluid can also include water-miscible liquids, hydrocarbon liquids, and gases.

The treatment fluid can also contain various other additives. The other additives can include, for example, silica scale control additives, surfactants, gel stabilizers, antioxidants, polymer degradation prevention additives, relative permeability modifiers, scale inhibitors, corrosion inhibitors, foaming agents, defoaming agents, antifoaming agents, emulsifying agents, de-emulsifying agents, iron control agents, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like.

The capsules 200 include an explosive substance 201. The explosive substance can make up any portion of the capsule or containment in any location, including the core or periphery. The explosive substance 201 can be in a variety of forms, including liquids, gels, plastics, or powders. Explosive powders may be compressed to form dense pellets, for example. Explosives may also include chemically non-reactive, non-explosive materials, for example, sawdust and waxes as binders. These additional non-explosive materials may contribute to stabilizing an otherwise overly sensitive explosive.

The explosive substance 201 can be a primary explosive, secondary explosive, or other substance that releases energy in the form of a pressure wave when initiated. Examples of suitable primary explosives include, but are not limited to, lead azide, lead styphnate, silver azide, silver fulminate, pentaerythritol tetranitrate "PSTN", and sodium azide.

Examples of suitable secondary explosives include, but are not limited to: 2,6-Bis(picrylamino)-3,5-dinitropyridine "PYX"; (1,3,5-trinitro-2,4,6-tripicrylbenzene) "BRX"; (2,2', 2"-4,4',4"-6,6',6"-nonanitro-m-terphenyl) "NONA"; HNS-1 (wherein HNS is fenerally hexanitrostilbene); HNS-II;

HNS-IV; 2,4,6,8,10,12-hexanitro-2,4,6,8,10,12-hexaazaisowurtzitane (HNIW) "CL-20"; N,N'-bis(1,2,4-triazol-3-yl)-4,4'-diamino-2,2',3,3',5,5',6,6'-octanitroazobenzene "BTDAONAB", tetranitrobenzotriazolo-benzotriazole "Tacot"; and dodecanitro-m,m'-quatraphenyl "DODECA".

Examples of other substances include energetic salts, energetic binders or plasticizers, micro silica materials, thermobaric mixtures, thermite mixtures, and combinations thereof in any proportion. The energetic salt can be selected from the group consisting of diazonium salts ($R-N_2^+$), bromate salts ($BrO_3^-$), chlorate salts ($ClO_3^-$), chlorite salts ($ClO_2^-$), perchlorate salts ($ClO_4^-$), picrate salts (2,4,6-trinitrophenoxide), picramate salts (2-amino-4,6-dinitrophenoxide), hypohalite salts ($XO^-$), and iodate salts ($IO_3^-$), and combinations thereof. The energetic binder or plasticizer can be selected from the group consisting of: (3-nitratomethyl-3-ethyl oxetane) "polyNIMMO"; (1,1-[methylenebis(oxy)]-bis-[2-fluoro-2,2-dinitroethane]) "FEFO"; polyglycidyl nitrate "PGN"; and combinations thereof. The thermobaric mixture can include a metal or metal alloy, usually aluminum, and a nitramine or other oxidizer. By way of example, the other substance can be selected from potassium azidodisulfate; bismuth nitride; magnesium and silver nitrate; magnesium and ceric ammonium nitrate; magnesium and iodopentoxide; magnesium and barium peroxide; magnesium and iodine; aluminum and iodine; zinc and iodine; and boron and silver difluoride.

The capsules 200 also include a plurality of micro-proppant 202. The micro-fractures 118 of the fracture network 120 are small. Typical proppant used in hydraulic fracturing stimulation, in the range of 100 to 12 mesh (149-1,680 micrometers "µm"), cannot invade the micro-fractures 118, and therefore, will not prop or keep the micro-fractures 118 open when hydraulic pressure from the fracturing fluid 108 is withdrawn. Thus, the micro-proppant 202 can have a size smaller than 100 mesh (149 µm), and in certain instances, equal to or smaller than 200 mesh (74 µm), 230 mesh (63 µm) or even 325 mesh (44 µm).

The micro-proppant and any other proppant can be selected from the group consisting of nut shells, sand, ceramics, natural sand, quartz sand, particulate garnet, metal particulates, glass, nylon pellets, bauxite and other ores, polymeric materials, and combinations thereof in any proportion. The micro-proppant 202 can have a density in the range of about 0.2 to about 5 grams per cubic centimeter ($g/cm^3$) and combinations thereof. Commercially available examples of suitable micro-proppant include, Zeeospheres available from Zeeospheres Ceramics, LLC in Lockport, La. or HGS2000™, HGS3000™, HGS4000™, HGS5000™, HGS6000™, HGS10000™, and HGS18000™ glass bubbles available from 3M in St. Paul, Minn. The proppant particles can be substantially spherical in shape, fibrous materials, polygonal shaped (such as cubic), irregular shapes, and any combination thereof.

Figure 4A:
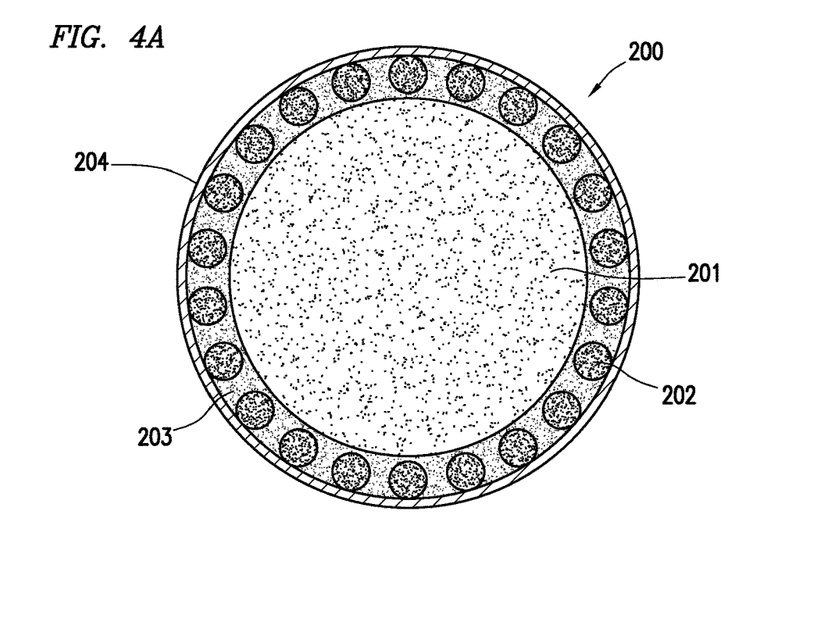
FIGS. 4A and 4B are cross-sectional views of capsules including a core of an explosive material and micro-proppant surrounding the core.
Figure 4B:
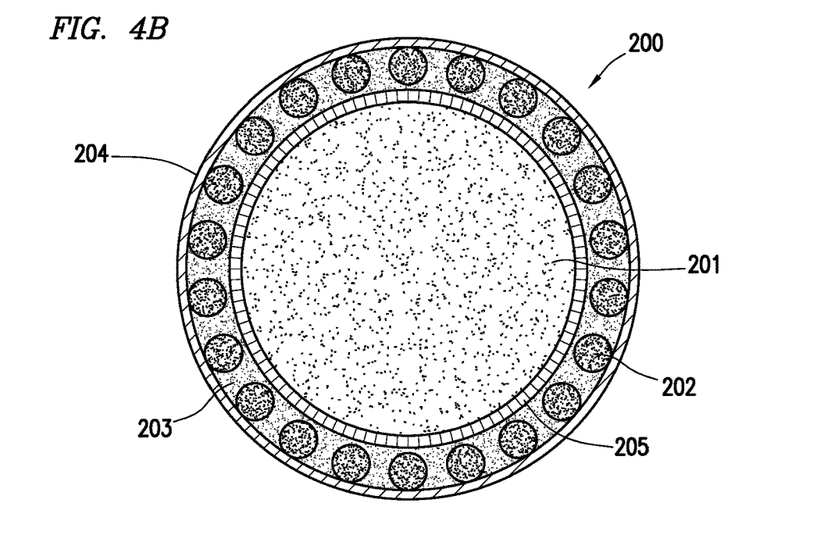
Figure 5A:
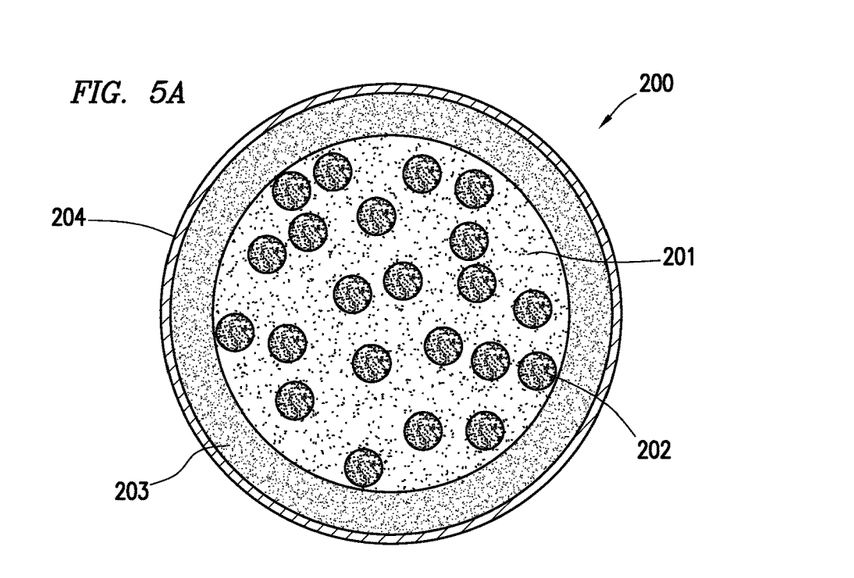
FIGS. 5A and 5B are cross-sectional views of capsules including a matrix of an explosive material and micro-proppant embedded within the matrix.
Figure 5B:
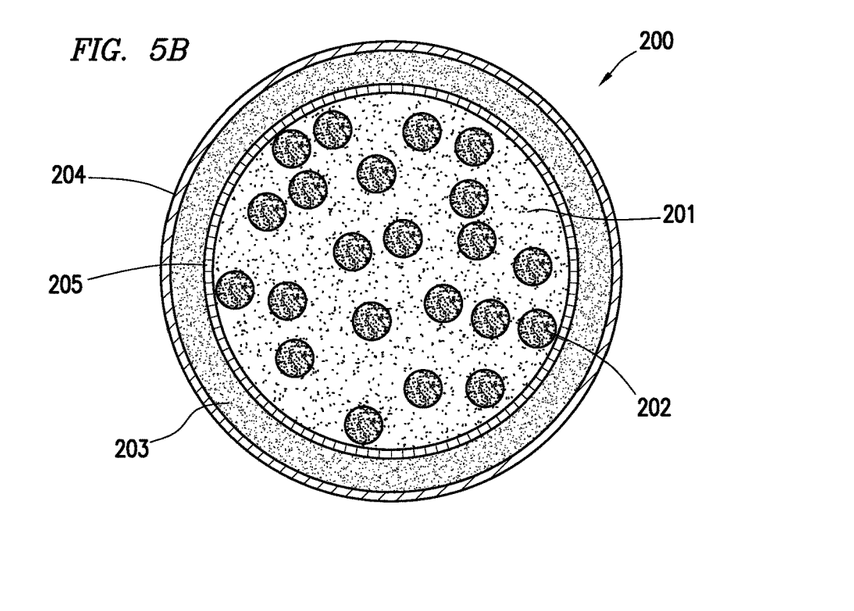

As can be seen in FIGS. 4A and 4B, the explosive substance 201 can form the interior of the capsules. The micro-proppant 202 can be attached to or adhered to the explosive substance 201 via chemical attraction or a binder material 203, such as a tackifying agent. As can be seen in FIGS. 5A and 5B, the explosive substance 201 can form a matrix of the capsules 200 wherein the micro-proppant 202 are dispersed uniformly or non-uniformly throughout the matrix of the capsules.

As can be seen in FIGS. 4B and 5B, the capsules 200 can further include an intermediate layer 205 positioned between the core and the micro-proppant 202 or the core and the coating 204. The intermediate layer 205 can be a water-wicking material, such as cellulose micro or nanofibrils (native or modified) in a cellulose binder, chitin (native or modified), or a hydrophilic coating on zeospheres using organo-silane type chemistry. The intermediate layer 205 can also be an initiator for initiating the detonation or deflagration of the explosive substance 201. By way of example, the intermediate layer 205 can be made of a water-sensitive explosive material, energetic salts, energetic binders or plasticizers, micro silica materials, thermobaric mixtures, or thermite mixtures, for example, the intermediate layer can be made from a magnesium/silver mixture that reacts with water to cause initiation of the explosive material. The initiator material can be activated by a reaction with water, for example, the intermediate layer 205 can include magnesium particles that are embedded within a wax with fatty acids in which the magnesium particles react with water to initiate the explosive substance 201.

The capsules or containment 200 can also include a coating 204 that partially or completely surrounds the explosive substance 201 and the micro-proppant 202. The coating 204 can be impermeable to water. The coating 204 can also have a porosity such that water is delayed from coming in contact with the explosive substance 201 and/or the intermediate layer 205 for a desired amount of time (for example, when the explosive substance 201 is initiated via a reaction with water). The coating can be selected from a degradable polymer (e.g., polylactic acid (PLA), polyglycolic acid (PGA)), cellulose acetate phthalate, cellulose acetate, cellulose butyrate, cellulose acetate butyrate, or poly-isobutyl methacrylate.

The intermediate layer 205, the coating 204, and any other layers can be created using micro-encapsulation processes and other chemical techniques, as are known in the art, including pan coating, air-suspension coating, centrifugal extrusion, vibration nozzle, spray-drying, ionotropic gelation, coacervation, interfacial polycondensation, interfacial cross-linking, in situ polymerization, matrix polymerization, water beds, etc.

The methods include allowing initiation of the explosive substance 201. The explosive substance 201 can be initiated from a chemical reaction with water (commonly called a water-sensitive explosive material); from an initiator, such as from the intermediate layer; from the closure pressure exerted on the capsules from the fractures of the fracture network; or from friction or pressure from some of the micro-proppant 202 crushing under the closure stress from the fractures. Preferably, the detonation of the explosive substance does not obliterate the micro-proppant such that it is incapable of flowing into the micro-fractures.

According to certain embodiments, the explosive substance 201 is initiated by a reaction with water. According to these embodiments, the coating 204, the binder material 203, and the intermediate layer 205 (if included) are degradable downhole, due to temperature or dissolution in wellbore fluids, for example. After partial or complete degradation of the coating, binder material, and other layers, the explosive substance 201 is exposed to water downhole. The exposure to water allows the explosive substance 201 to detonate.

According to certain other embodiments, the explosive substance 201 is initiated from an initiator. According to these embodiments, after the partial or complete degradation of the coating 204 and binder material 203, the intermediate layer 205 acting as the initiator undergoes a chemical reaction (with water for example) to initiate the explosive substance 201.

According to certain other embodiments, the explosive substance 201 can be pressure-sensitive. According to these embodiments, the sensitivity of the explosive substance is less than the closure stresses from the fractures (including the primary fractures 116 and micro-fractures 118) such that the closure stresses cause initiation of the explosive substance 201.

According to certain other embodiments, at least some of the micro-proppant 202 has a crush strength less than the closure stresses of the fractures. Accordingly, at least some of the micro-proppant 202 has a crush strength greater than the closure stresses of the fractures such that those micro-proppant do not crush. The crushable micro-proppant 202 can cause initiation of the explosive substance 201 due to the friction, heat, or pressure created during the crushing.

The explosive substance 201 will have a critical diameter at which above this critical diameter, the substance can be detonated and below this critical diameter, the substance cannot be detonated. By way of example, lead azide has a critical diameter of 400 μm. The capsules 200 can be made such that the explosive substance 201 has a diameter less than the critical diameter for that particular explosive substance. This may occur when it is desirable to place the capsules 200 within the micro-fractures 118 or as close to the entrance of the micro-fractures as possible. The capsules 200 or the explosive substance 201 can further include a tackifying agent or other sticky substance that would allow the capsules or cores to coalesce within the fracture network 120 to form an agglomerate of explosive substance 201. This agglomerate can have a diameter that is greater than or equal to the critical diameter for that explosive substance. In this manner, the agglomerate can be initiated and detonate.

The detonation of the explosive substance 201 produces one or more micro-seismic events. As used herein, the term "micro-seismic event" refers to any event that causes a small but detectable change in stress and pressure distributions in a subterranean formation, including those caused by slippages, deformation, and breaking of rock along natural fractures, bedding or faults, creation of fractures or re-opening of fractures, and events artificially created by fracturing operations or caused by an explosion, implosion, exothermic reaction, etc. The micro-seismic events can then be used to map the micro-fractures 118 of the fracture network 120. One of ordinary skill in the art will be able to select the necessary equipment to map the micro-fractures 118 from the micro-seismic events.

The methods include causing or allowing at least a portion of the micro-proppant 202 to enter one or more of the micro-fractures 118. According to certain embodiments, the detonation of the explosive substance 201 can help force some of the micro-proppant 202 into the micro-fractures 118. Any additional micro-proppant included in the treatment fluid can also enter the micro-fractures 118. Preferably, the majority of or all of the micro-fractures 118 contain micro-proppant such that the micro-fractures remain propped open. This allows for a substantial increase in production of reservoir fluids. As discussed earlier, larger proppant can be placed into the primary fractures 116. The larger proppant and the micro-proppant can form proppant packs within the fractures. The proppant packs can be consolidated by the use of a curable resin system or consolidating agent. As used herein, the term "larger proppant" refers to proppant having a particulate size distribution ranging from a lower limit of about 35 microns, 50 microns, 100 microns, or 200 microns to an upper limit of about 800 microns, 750 microns, 500 microns, or 250 microns.

The placement of the micro-proppant 202 and any additional micro-proppant into the micro-fractures 118 can be optimized by selecting micro-proppant that have different densities. For example, some of the micro-proppant 202 of the capsules 200 (that have a high enough crush strength to withstand the closure stresses) can have a higher density than some of the other micro-proppant 202 of the capsules 200. By way of another example, the micro-proppant 202 of the capsules 200 can have a higher density (or lower density) than additional micro-proppant that is carried with the treatment fluid. The higher density micro-proppant can fill the lower portion of the micro-fractures 118, while the lower density micro-proppant can fill the upper portion of the micro-fractures. As used herein, the relative term "lower" refers to a location farther away from the Earth's surface; while the relative term "upper" refers to a location closer to the Earth's surface.

Proppant can be known to bridge upon each other and form a dense mass within fractures. This is commonly known as screening out. The mass of proppant can impede or prevent adequate fluid flow through the fractures. One of the many advantages to using the detonation of the explosive substance 201 to map the micro-fractures and possibly help place micro-proppant within the micro-fractures is that the detonation can also be used to re-distribute any bridged proppant that may already be present in the fracture network. The re-distribution can help more evenly distribute the proppant within the fractures of the fracture network and reduce or eliminate screening out. This has the obvious advantage of increasing production of reservoir fluids.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of mapping micro-fractures of a fracture network comprising:
   introducing a capsule into the fracture network, wherein the capsule comprises an explosive substance, a core, a coating, an intermediate layer, and a plurality of micro-proppant; wherein the intermediate layer is positioned between the core and the micro-proppant or the core and the coating; wherein the intermediate layer comprises an initiator for initiating the explosive substance; wherein the intiator comprises a water-sensitive explosive material that reacts with water to initiate the explosive substance;
   allowing initiation of the explosive substance to occur, wherein initiation of the explosive substance causes detonation of the explosive substance, and wherein the detonation produces one or more micro-seismic events; and
   causing or allowing at least a portion of the micro-proppant to enter one or more of the micro-fractures.

2. The method according to claim 1, wherein the step of introducing is performed simultaneously with or after the creation of the fracture network.

3. The method according to claim 1, wherein the capsule is introduced into the fracture network via a treatment fluid.

4. The method according to claim 3, wherein the treatment fluid further comprises additional micro-proppant or small proppant.

5. The method according to claim 1, wherein the explosive substance is a primary explosive, a secondary explosive, or other substance that releases energy in the form of a pressure wave when initiated.

6. The method according to claim 5, wherein the explosive substance is selected from lead azide, lead styphnate, silver azide, silver fulminate, pentaerythritol tetranitrate "PETN", and sodium azide.

7. The method according to claim 5, wherein the other substance is selected from the group consisting of energetic salts, energetic binders or plasticizers, micro silica materials, thermobaric mixtures, thermite mixtures, and combinations thereof in any proportion.

8. The method according to claim 1, wherein the micro-proppant have a particle size smaller than 149 micrometers.

9. The method according to claim 1, wherein the micro-proppant have a density in the range of about 0.2 to about 5 grams per cubic centimeter and combinations thereof.

10. The method according to claim 1, wherein the micro-proppant are attached to or adhered to the core via chemical attraction or a binder material or a tackifying agent.

11. The method according to claim 1, wherein the explosive substance forms a matrix of the capsules, wherein the micro-proppant are dispersed uniformly or non-uniformly throughout the matrix.

12. The method according to claim 1, wherein the coating is selected from a degradable polymer, cellulose acetate phthalate, cellulose acetate, cellulose butyrate, cellulose acetate butyrate, or poly-isobutyl methacrylate.

13. The method according to claim 1, wherein the explosive substance is initiated from a chemical reaction with water; from an initiator; from the closure pressure exerted on the capsules from primary fractures or the micro-fractures of the fracture network; or from friction or pressure from some of the micro-proppant crushing under a closure stress from the primary or micro-fractures.

14. The method according to claim 1, wherein one or more micro-seismic events are used to map at least the micro-fractures of the fracture network.

15. The method according to claim 1, wherein the detonation of the explosive substance forces some of the micro-proppant into the micro-fractures.

16. The method according to claim 1, wherein larger proppant is placed into primary fractures of the fracture network.

17. The method according to claim 16, wherein at least the larger proppant forms a proppant pack within the primary fractures.

18. The method according to claim 17, wherein the proppant pack is consolidated by the use of a curable resin system or consolidating agent.

19. The method according to claim 1, wherein the capsule is introduced into the fracture network using one or more pumps.

20. A method of mapping micro-fractures of a fracture network comprising:
    introducing a coated capsule into the fracture network, wherein the coated capsule comprises an explosive substance, a core, an intermediate layer, and a plurality of micro-proppant; wherein the intermediate layer is positioned between the core and the micro-proppant or the core and the coating; wherein the intermediate layer comprises an initiator for initiating the explosive substance; wherein the initiator comprises a water-sensitive explosive material that reacts with water to initiate the explosive substance;
    allowing initiation of the explosive substance to occur, wherein initiation of the explosive substance causes detonation of the explosive substance, and wherein the detonation produces one or more micro-seismic events; and
    causing or allowing at least a portion of the micro-proppant to enter one or more of the micro-fractures.

21. A method of mapping micro-fractures of a fracture network comprising:
    introducing a containment of an explosive substance, a core, a coating, an intermediate layer; and a plurality of micro-proppant into the fracture network; wherein the intermediate layer is positioned between the core and the micro-proppant or the core and the coating; wherein the intermediate layer comprises an initiator for initiating the explosive substance; wherein the initiator comprises a water-sensitive explosive material that reacts with water to initiate the explosive substance;

allowing initiation of the explosive substance to occur, wherein initiation of the explosive substance causes detonation of the explosive substance, and wherein the detonation produces one or more micro-seismic events; and causing or allowing at least a portion of the micro-proppant to enter one or more of the micro-fractures.

22. A capsule for mapping micro-fractures of a fracture network comprising:

an explosive substance;

a core;

a coating;

a plurality of micro-proppant; and an intermediate layer positioned between the core and the micro-proppant or the core and the coating; wherein the intermediate layer comprises an initiator for initiating the explosive substance; and wherein the initiator comprises a water-sensitive explosive material that reacts with water to initiate the explosive substance.

* * * * *